(12) United States Patent
Condict

(10) Patent No.: US 8,321,648 B2
(45) Date of Patent: Nov. 27, 2012

(54) USE OF SIMILARITY HASH TO ROUTE DATA FOR IMPROVED DEDUPLICATION IN A STORAGE SERVER CLUSTER

(75) Inventor: Michael N. Condict, Lexington, MA (US)

(73) Assignee: NetApp, Inc, Sunnyvale, CA (US)

( * ) Notice: Subject to any disclaimer, the term of this patent is extended or adjusted under 35 U.S.C. 154(b) by 425 days.

(21) Appl. No.: 12/606,088

(22) Filed: Oct. 26, 2009

(65) Prior Publication Data

US 2011/0099351 A1 Apr. 28, 2011

(51) Int. Cl.
*G06F 12/00* (2006.01)
(52) U.S. Cl. ........ 711/170; 711/114; 711/156; 711/165; 711/216
(58) Field of Classification Search .................. None
See application file for complete search history.

(56) References Cited

U.S. PATENT DOCUMENTS

| | | | | |
|---|---|---|---|---|
| 2003/0115218 A1* | 6/2003 | Bobbitt et al. | ................. | 707/200 |
| 2008/0270729 A1* | 10/2008 | Reddy et al. | .................. | 711/170 |

OTHER PUBLICATIONS

Bhagwat, et al., "Extreme Binning: Scalable, Parallel Deduplication for Chunk-Based File Backup", pp. 1-9, Sep. 2009, www.hpl.hp.com/personal/Mark_Lillibridge/Extreme/final.pdf.

Charikar, et al., "Similarity Estimation Techniques form Rounding Algorithms", Annual ACM Symposium on Theory of Computing, Proceedings of the Thirty-Fourth Annual ACM, Session 7A, pp. 380-388, May 19-21, 2002.

Manku, et al., "Defecting Near-Duplicates for Web Crawling", International World Wide Web Conference, Proceedings of the 16th international conference on World Wide Web, pp. 141-150, May 8-12, 2007, http://www2007.org/papers/paper215.pdf.

Zhu, et al., "Avoiding the Disk Bottleneck in the Data Domain Deduplication File System", USENIX Association, Fast 08: 6th USENIX Conference on File and Storage Technologies, pp. 269-282, Feb. 2008.

* cited by examiner

*Primary Examiner* — Shawn X Gu

(74) *Attorney, Agent, or Firm* — Perkins Coie LLP

(57) ABSTRACT

A technique for routing data for deduplication in a storage server cluster includes computing, for each node in the cluster, a value collectively representative of the data stored on the node, such as a "geometric center" of the node. New or modified data is routed to the node which has stored data identical or most similar to the new or modified data, as determined based on those values. Each node stores a plurality of chunks of data, where each chunk includes multiple deduplication segments. A content hash is computed for each deduplication segment in each node, and a similarity hash is computed for each chunk from the content hashes of all segments in the chunk. A geometric center of a node is computed from the similarity hashes of the chunks stored in the node.

26 Claims, 10 Drawing Sheets

USE OF SIMILARITY HASH TO ROUTE DATA FOR IMPROVED DEDUPLICATION IN A STORAGE SERVER CLUSTER

FIELD OF THE INVENTION

At least one embodiment of the present invention pertains to network storage systems, and more particularly, to a technique for routing data for improved deduplication in a clustered storage server system.

BACKGROUND

Network based storage, or simply "network storage", is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

In a large-scale storage system, such as an enterprise storage network, it is common for certain data to be stored in multiple places in the storage system. Sometimes this duplication is intentional, but often it is an incidental result of normal operation of the storage system. Therefore, it is common that a given sequence of data will be part of two or more different files, for example. "Data duplication", as the term is used herein, generally refers to unintentional duplication of data in a given storage device or system. Data duplication generally is not desirable, because storage of the same data in multiple places consumes extra storage space, which is a valuable and limited resource.

Consequently, storage servers in many large-scale storage systems have the ability to "deduplicate" data, which is the ability to identify and remove data duplication. In one known approach to deduplication, any extra copies of a given sequence of data are deleted, and any references (e.g., pointers) to those duplicate sequences are modified to refer to the one remaining instance of that sequence. A result of this process is that a given sequence of data may end up being shared by two or more files (or other types of logical data containers).

Deduplication is closely related to another technique used to reduce the physical storage needed for a given amount of data, namely data compression (also known as file compression). The primary difference between data compression and deduplication is the scale at which they operate. Data compression typically operates by removing duplicate data sequences as short as two bytes, while deduplication typically operates on duplicate sequences of length 1 KB to 4 KB. At the smaller scale of data compression, the size of the metadata needed to reconstruct the duplicate data sequences becomes an overriding issue in its effectiveness. Advanced techniques such as arithmetic coding are generally needed to reduce the size of the metadata. In data deduplication, on the other hand, the metadata is so much smaller than the eliminated duplicate data that it does not significantly contribute to reducing the space efficiency.

The main consideration in choosing the size (or average size) of the data segments in a deduplication method is the resulting deduplication ratio, which is the percentage reduction in physical storage requirements. The space used by the deduplication metadata is overhead that reduces the deduplication ratio. Usually, the size of the metadata is proportional to the number of data segments. This means that smaller segments, which result in a larger number of segments being required, cause a corresponding increase in the metadata. On the other hand, choosing a smaller segment size results in more duplication being found and eliminated. A balance must be struck, therefore, between two extremes: 1) choosing segment sizes so small that the large number of segments causes the metadata size to significantly reduce the deduplication ratio, and 2) choosing segment sizes so large that large amounts of duplication are not detected, also reducing the deduplication ratio.

It has been observed that deduplication segment sizes in the range of 1 KB to 4 KB tend to provide the highest deduplication ratios, given typical metadata implementations that require a fixed number of bytes per segment, usually around 15 to 30. The implications of this observation are important when deduplicating data across a storage server cluster.

A storage server cluster is a storage system formed from a set of cooperating storage server nodes connected by a switching fabric. This type of configuration can be used to increase storage capacity, performance, or reliability. Often the goal of such a system is to provide a seamless collection of physical storage in which the end users need not be concerned with which node contains any particular piece of data. This property is called location transparency. Within the context of such a system, conventional deduplication techniques can be used to remove duplication that occurs within any one node of the system. However, it would improve the storage efficiency of the system to remove or avoid duplication that occurs between different nodes of the cluster as well.

One way to achieve this is to arrange that a newly written data segment that is identical to an existing data segment be assigned to the same node as the existing one, so that they can be deduplicated using conventional techniques. The best known way to achieve this is to route data segments to nodes according to their content, so that a second data segment with the same content will be sent to the same node as the first copy. This usually involves the use of a mechanism that hashes the content of the segment to a node identifier.

A related problem, in a location-transparent storage cluster, is identifying the node that has a particular data segment requested by a read operation. A read operation will request data by its logical position within the overall data set (its address), not by its content or its node location. Therefore, a hash function that maps data content to a node number is not useful in locating data. Instead, a database can be maintained that maps from a logical data segment address to the node that contains that data segment. The size of this database can be significant, as will now be explained.

The desire for small data segments to improve the deduplication ratio conflicts with the desire for an efficient method to find the node location of each data segment. The problem is one of scale. Current storage clusters might have hundreds of nodes, each containing several terabytes of storage. Such a cluster may thus have a capacity of many petabytes of storage. With a segment size of 1 KB, the storage cluster could contain several trillion data segments. Given these numbers, a database that maps data segment addresses to node numbers would have to be enormous, many times more than the maximum amount of RAM that can be installed in today's servers.

Another problem with the use of small segments is the inefficiency of having to gather data from multiple nodes when servicing a read request. If, for example, each 1 KB segment is stored on a different node of the cluster, this implies that a 16 KB read operation requires communicating with up to 16 different nodes. Having to read segments from multiple nodes to service a given read request can cause significant network latency and bandwidth usage within a cluster.

SUMMARY

A technique is introduced here for efficiently routing data for deduplication in a storage server cluster that includes multiple storage server nodes. In general, the technique includes computing for each node a value representative of the data stored on the node. This value is called the "geometric center" of the node. It will be understood that this does not refer to a geometric center in a spatial sense, but rather, it is a representation of the content stored on the node. When a write request is received at one of the nodes, one of the nodes in the cluster is selected to store the new or modified data according to a deduplication criterion, based on the computed geometric center values of the nodes and the content of the new or modified data. More specifically, the new or modified data will normally be routed to a node whose stored data either includes data identical to the new or modified data or whose stored data includes data that is most similar to the new or modified data, as determined based on all of the nodes' geometric centers, thereby avoiding unnecessary duplication of data across different nodes in the cluster.

To compute the geometric centers, in certain embodiments the data objects (e.g., files or LUNS) stored in each node are initially each divided logically into some number of "chunks". Each chunk is then logically divided into multiple data segments, also called "deduplication segments" or just "segments". Segments can be fixed size or variable size, depending on the embodiment. A chunk is the basic unit of data for purposes of assigning data to a node to reduce duplication, whereas a segment is actually the basic unit of deduplication, i.e., the basic unit of data sharing. Typically there will be many segments in each chunk, such that a chunk is substantially larger than a segment. Using relatively small data sequences (segments) for deduplication achieves effective deduplication, while using much large data sequences (chunks) as the unit of routing data to particular nodes results in a manageably small data location database and greater read efficiency.

A content hash is computed for each data segment in each chunk stored in each node. A similarity hash is then computed for each chunk, as a function of the content hashes of all of the data segments in the chunk. The geometric center of each node is then computed as a function of the similarity hashes of all the chunks stored in the node. The geometric center of each node is stored in a location and manner so that it is accessible to all of the nodes in the cluster.

In certain embodiments the similarity hash is a fixed-length vector of small integers computed from the contents of the segments in a chunk. It has the property that if two chunks have many identical segments, the integers at each position in their two similarity hashes will have values close to one another. Thus, if one views a similarity hash as a point in n-dimensional space, where n is the length of the vector, then the distance (or "closeness") between two similarity hashes in this space is a good indicator of how many identical data segments the two corresponding data chunks have in common.

When a write request is received at any of the nodes in the cluster, the receiving node computes a new similarity hash for a chunk that includes a segment to be written (the "containing chunk") and compares it to the geometric center of each of the nodes, to determine which of the nodes geometric center is "closest" to the containing chunk in terms of its content. In one embodiment, the new or modified data segment is then written to the node whose data is determined to be closest (i.e., the node which has stored data most similar to the write data). Any time data is written to a node, its geometric center is updated.

In certain embodiments, selection of nodes to store new or modified data is done by using the geometric center values in conjunction with values indicative of the load on the various nodes in the cluster, to improve load-balancing across the cluster. These load related values are referred to herein as "gravitational coefficients" of the nodes. As the load (e.g., consumption of storage space) increases on a given node, its gravitational coefficient decreases, and vice versa. Accordingly, when selecting a node to receive write data, the node selection can be made as a function of both the geometric centers of the nodes and their gravitational coefficients. If, for example, the node whose geometric center is "closest" to that of the write data has much less free space than other nodes in the cluster (making its gravitational coefficient low), the write data may instead be directed to a node which is not as close but which is less heavily loaded (making its gravitational coefficient high). Thus, a node whose geometric center is not closest to that of the write data but whose gravitational coefficient is much higher than that of the other nodes may nonetheless be selected to store the write data, to improve load-balancing across the cluster.

Groups of similar data can also be moved between nodes, when it is convenient or desirable, to further improve the cluster's deduplication characteristics. Any time data is moved between nodes, the geometric centers and gravitational coefficients of the affected nodes are recomputed.

Thus, the technique introduced here uses a similarity hash on relatively large chunks of data, each including many deduplication segments, to partition the data chunks across the nodes of a storage cluster in a way that improves cluster-wide deduplication. The use of relatively large chunks, each including many deduplication segments, solves the problem of an impractically large data location database. Further, it avoids the inefficiency of having to gather individual segments from many different nodes during a read operation. Reading a large amount of data can be done by communicating with a single node to get a chunk.

The technique only needs to keep track of one small piece of information about the content on each node, namely, the geometric center of the chunks on that node, in order to route new data to the optimal node for deduplication. In addition, the technique can use an adjustable gravitational attraction parameter to determine when to automatically move clusters of similar objects to less loaded nodes, as a load-balancing technique.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

System Environment

Figure 1:
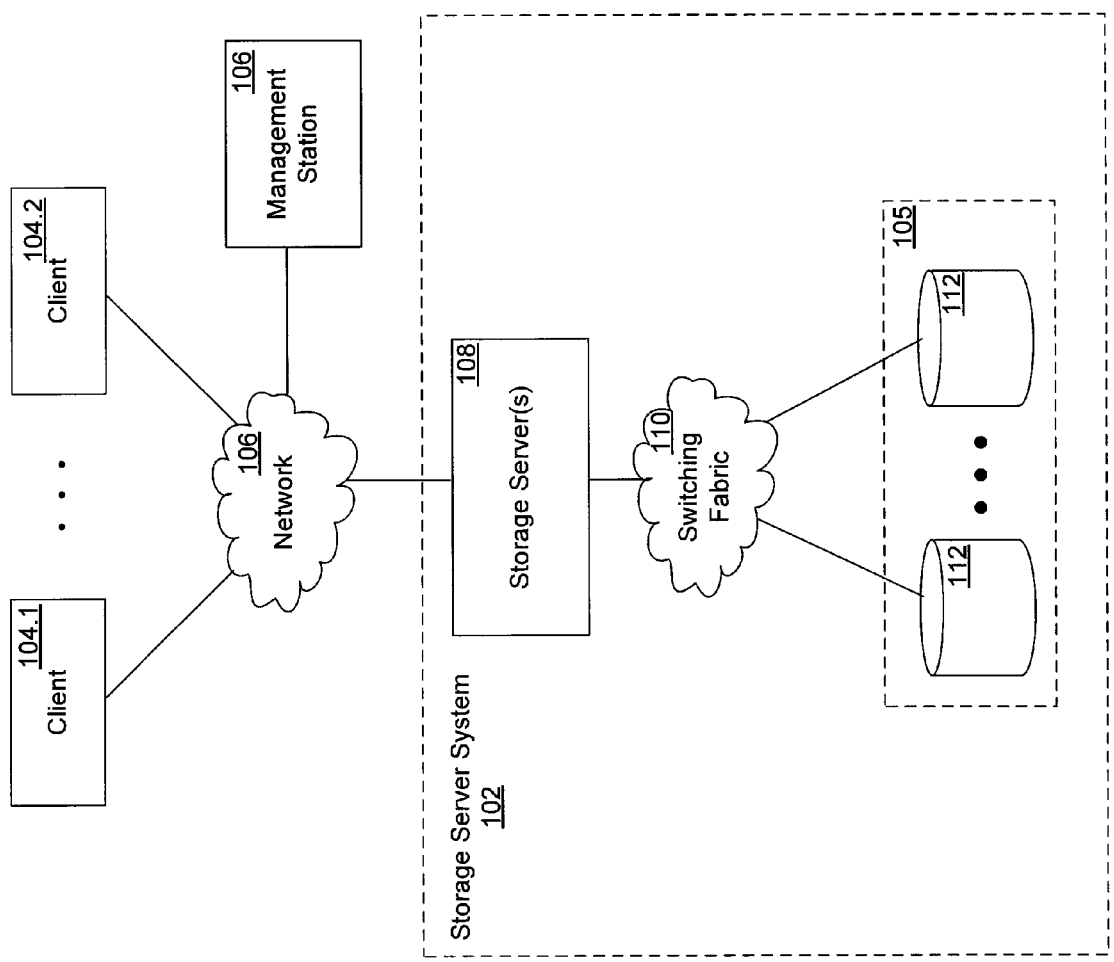
FIG. 1 illustrates a network storage environment in which the present invention can be implemented.
Figure 2:
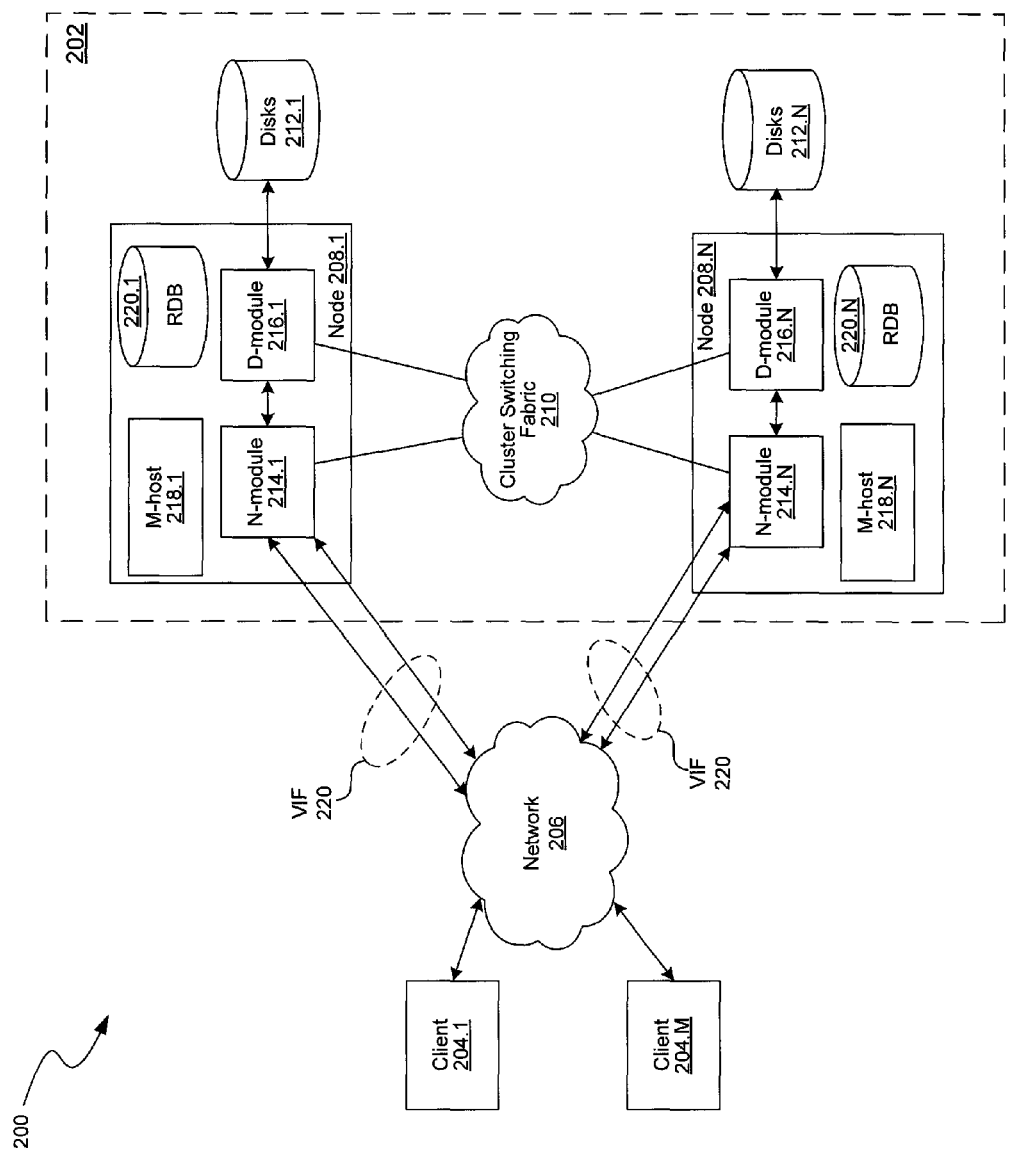
FIG. 2 illustrates a clustered network storage environment in which the present invention can be implemented.

FIGS. 1 and 2 show, at different levels of detail, a network configuration in which the techniques introduced here can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 212 can be other types of storage, such as flash memory, solid-state drives (SSDs), tape storage, etc.

The storage server (or servers) 108 may be, for example, one of the FAS-xxx family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical unit numbers (LUNs), directories, files). Note that a "file system" does not have to include or be based on "files" per se as its units of data storage.

Various functions and configuration settings of the storage server 108 and the mass storage subsystem 105 can be controlled from a management station 106 coupled to the network 106. Among many other operations, a data object migration operation can be initiated from the management station 106.

FIG. 2 depicts a network data storage environment, which can represent a more detailed view of the environment in FIG. 1. The environment 200 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc.

Each of the nodes 208 is configured to include several modules, including an N-module 214, a D-module 216, and an M-host 218 (each of which can be implemented by using a separate software module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The manner of such replication is not germane to the technique introduced here; any known or convenient technique for database replication can be used. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested. The RDB 220 may actually be implemented as multiple replicated databases that store different kinds of data and/or metadata.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
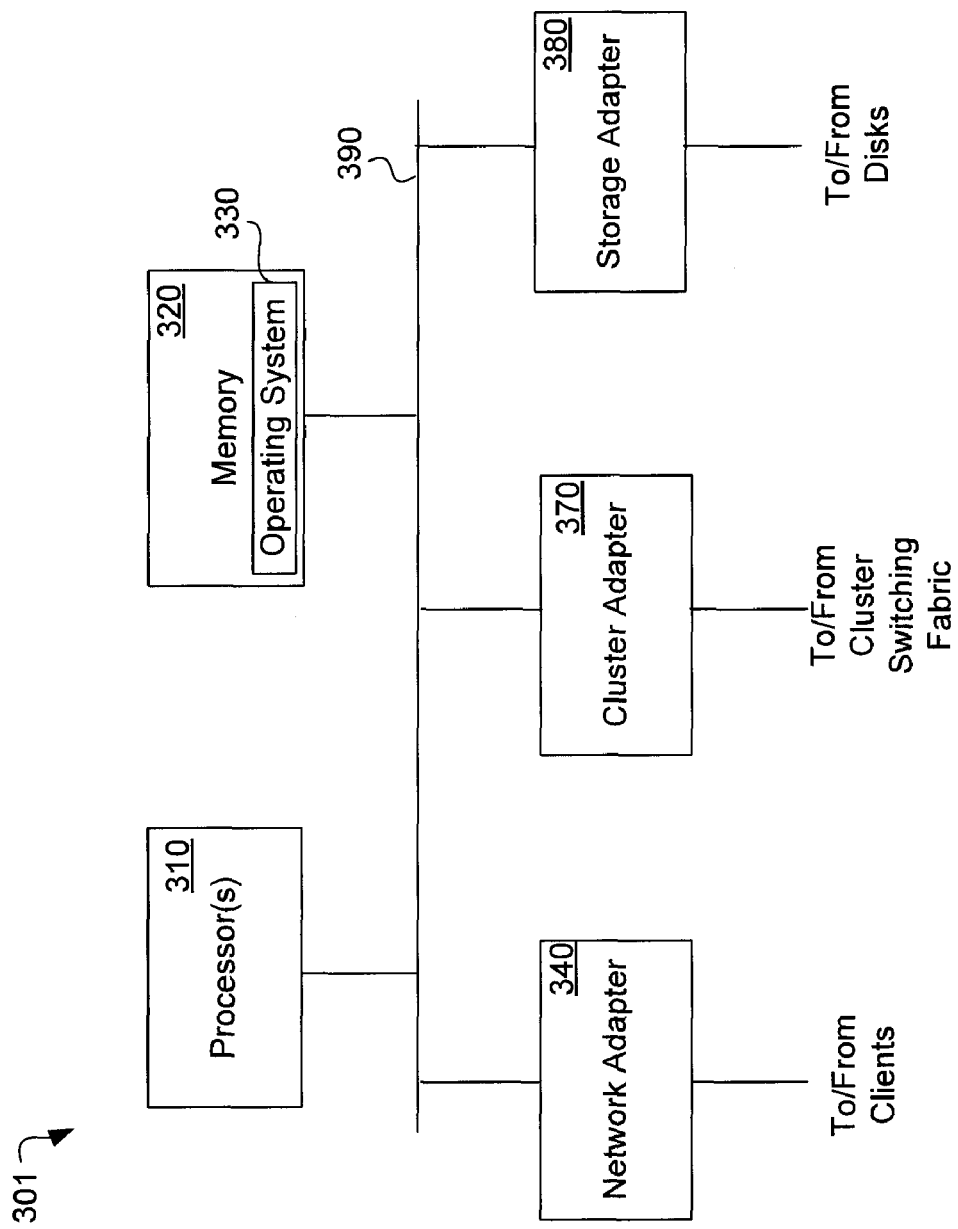
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processors(s) 310, functionally organizes the storage controller 301 by (among other things) configuring the processor(s) 310 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

In the illustrative embodiment, the storage operating system 330 is a version of the Data ONTAP® operating system available from NetApp, Inc. and the storage manager 460 implements the Write Anywhere File Layout (WAFL®) file system. However, other storage operating systems are capable of being enhanced or created for use in accordance with the principles described herein.

Figure 4:
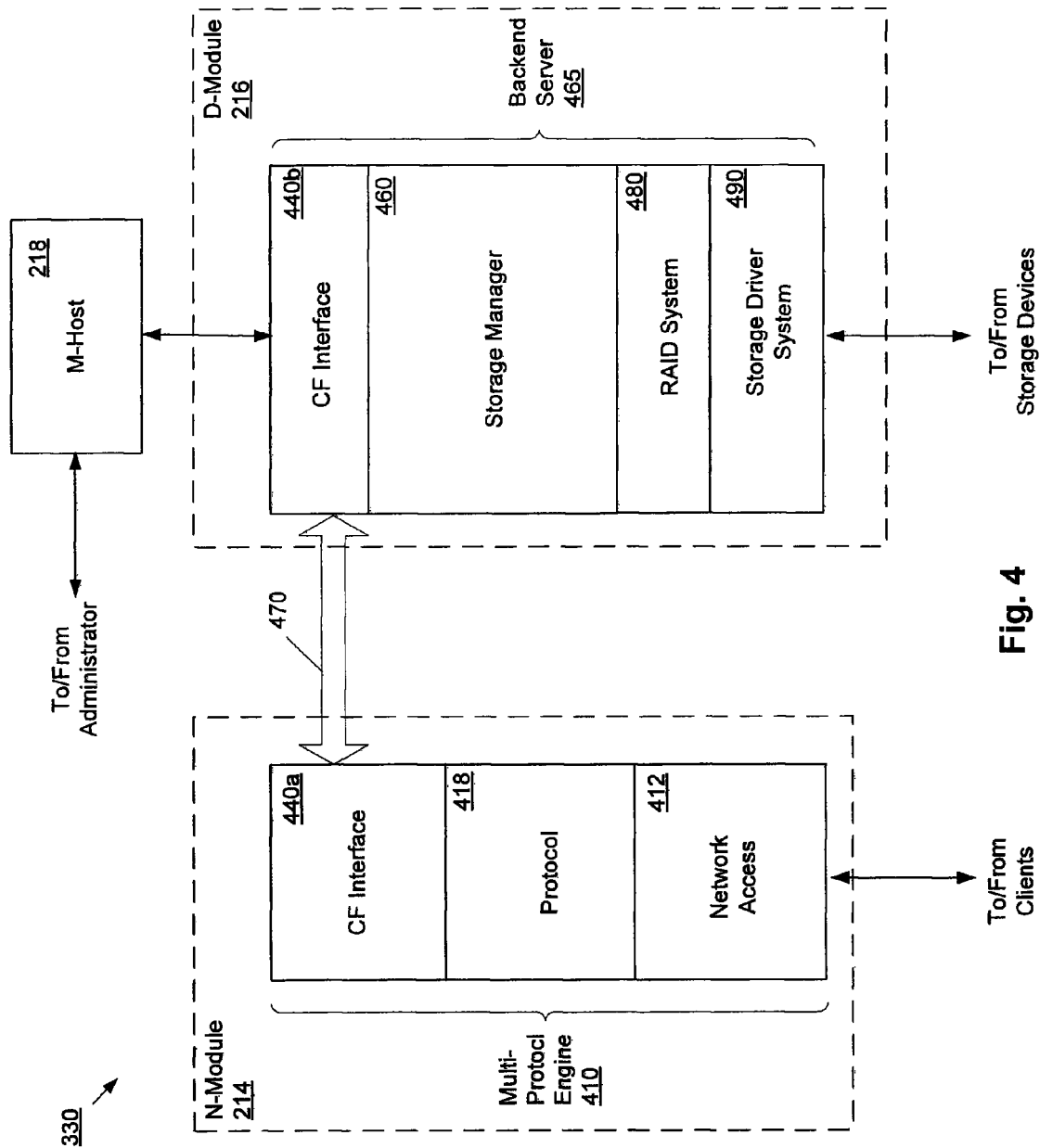
FIG. 4 illustrates an example of a storage operating system of a storage server node.

FIG. 4 is a diagram illustrating an example of storage operating system 330 that can be used with the technique introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 in combination with underlying processing hardware also forms the N-module 214. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multi-protocol engine 410 includes a cluster fabric (CF) interface module 440a which implements intra-cluster communication with D-modules and with other N-modules.

In addition, the storage operating system 330 includes a set of layers organized to form a backend server 465 that provides data paths for accessing information stored on the disks 212 of the node 208. The backend server 465 in combination with underlying processing hardware also forms the D-module 216. To that end, the backend server 465 includes a storage manager module 460 that manages any number of volumes 472, a RAID system module 480 and a storage driver system module 490. At least one of the volumes 472 includes at least one qtree 475 and at least one standard directory 474.

The storage manager 460 primarily manages a file system (or multiple file systems) and serves client-initiated read and write requests. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The backend server 465 also includes a CF interface module 440b to implement intra-cluster communication 470 with N-modules and/or other D-modules. The CF interface modules 440a and 440b can cooperate to provide a single file system image across all D-modules 216 in the cluster. Thus, any network port of an N-module 214 that receives a client request can access any data container within the single file system image located on any D-module 216 of the cluster.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 each can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

Routing Data for Improved Deduplication

The technique introduced here has several aspects. First, referring to FIG. 5A, the data 500 stored in each node and any new data that is added to any node in the cluster is divided logically into contiguous sequences called "deduplication segments", "data segments" or simply "segments". These segments 501 are the basic units of deduplication/data sharing. These can be fixed-length segments, the size of which is chosen in advance, or they can be variable-length segments, the boundaries of which are determined from the data content by using any known or convenient technique for doing so.

The technique introduced here further computes a value 508 called a content hash from the contents of each data segment 501; this is a function computed in such as way that if two data segments have the same content hash value, it is very likely they contain the same data. In certain embodiments the content hash is an n-bit binary integer, i.e., its value is between 0 and $2^n$, where n is a parameter of the method. In certain embodiments n is preferably between 32 and 256.

The technique also groups contiguous sequences of data segments into larger data sequences called "chunks", which are the basic unit of routing data for deduplication. In one embodiment, each chunk 503 consists of a fixed number of adjacent segments, with the number chosen in advance (i.e., prior to runtime).

The technique then computes a value 510 called a "similarity hash" for each chunk, as a function of the content hashes 508 of all of the segments in the chunk. The similarity hash 510 in one embodiment is an integer vector that contains a fixed-number of components, where the number of components is the same as the number of bits, n, in each content hash. This vector is treated as a point in n-dimensional space. An important property of a similarity hash 510 is that two chunks 503 that contain many identical segments 501 will have similarity hashes that are close to one another in the n-dimensional vector space, i.e., closer than would be expected by chance. The similarity hash 510 of a chunk may also be referred to as the "position" of the chunk in n-space. The measure of how "close" two similarity hashes are, i.e., the distance between them, can be computed as, for example, a Euclidean distance between the two vectors in n-space, or as another example, as the sum of the absolute values of the difference at each component of the vectors.

To decide which node of the cluster is most likely to contain data that is most similar to new data that is to be added to the storage cluster, the technique keeps track of, for each node, the geometric center (or just "center") of the positions of all the chunks on the node. When a new chunk of data is added to the cluster, it is sent to the node whose center is closest to the "position" of the chunk.

Figure 5A:
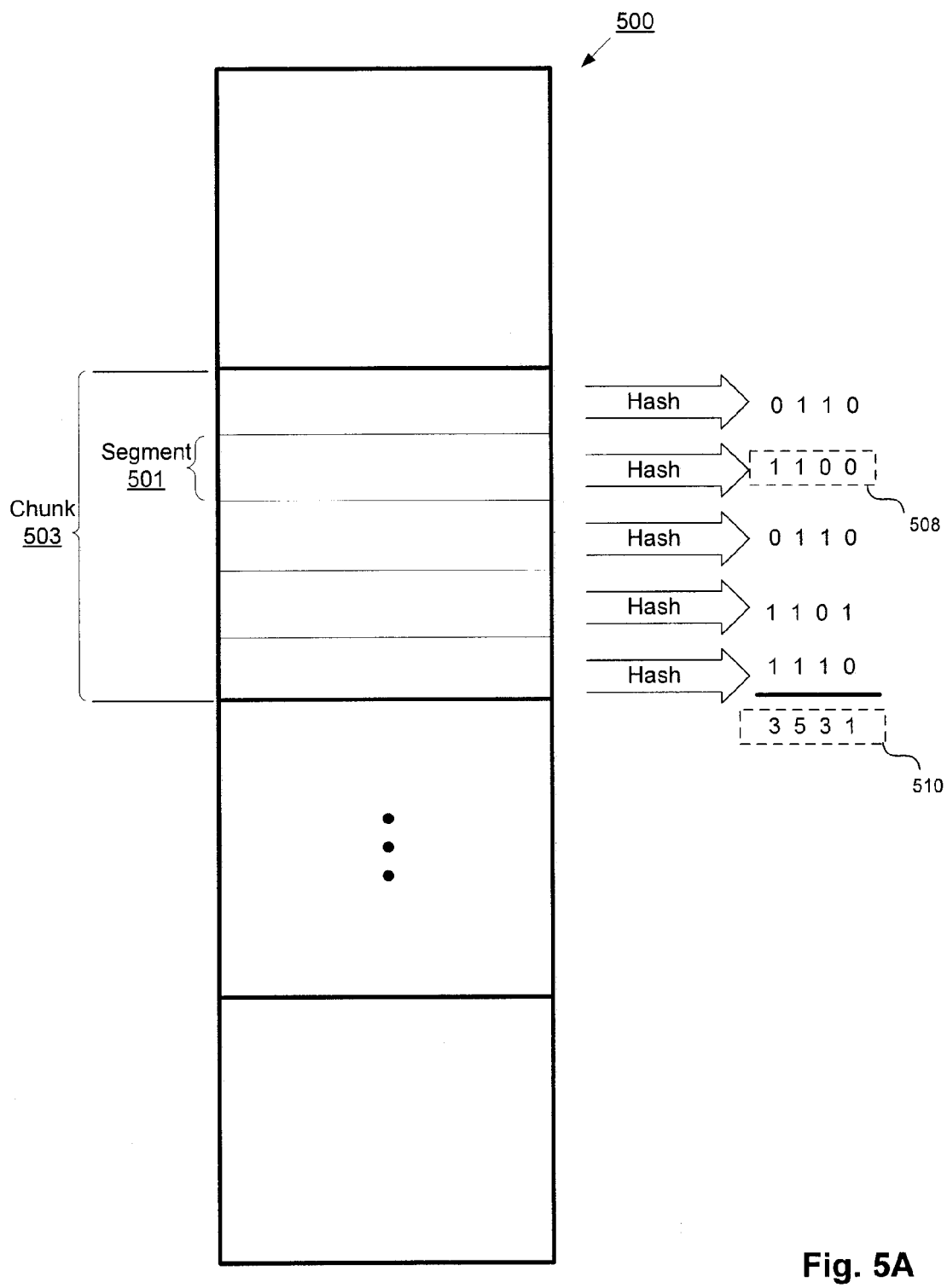
FIG. 5A illustrates how the data on node can be divided into chunks and segments, and an example of the computation of content hashes and similarity hash.
Figure 5B:
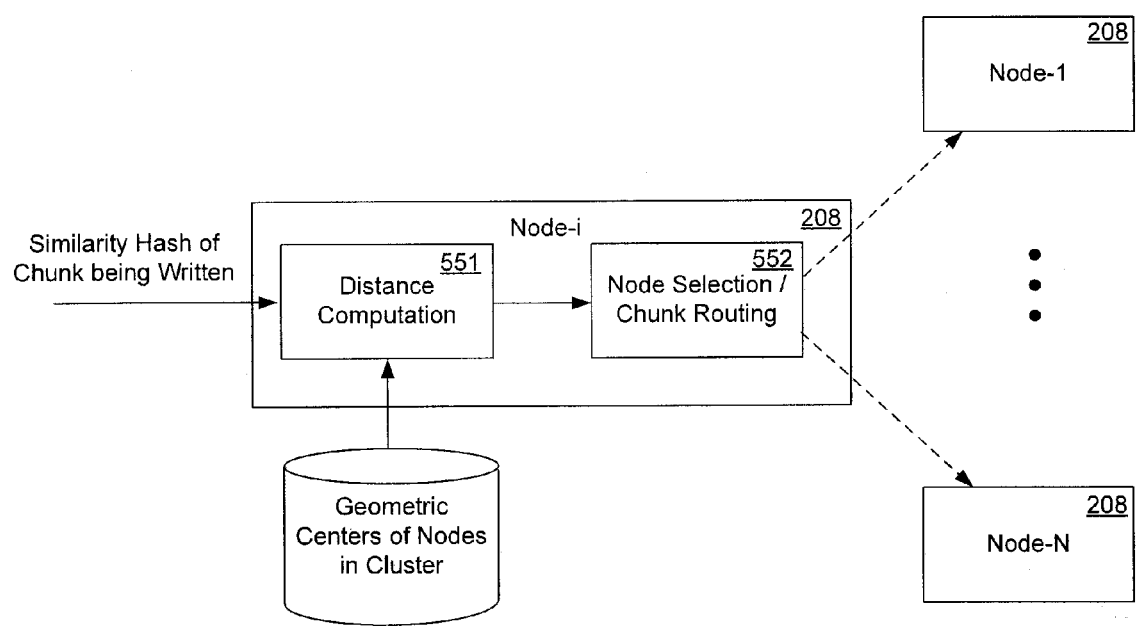
FIG. 5B conceptually illustrates a technique of routing a new or modified chunk to a particular node in a cluster, for storage, based on the similarity hash of the chunk and the geometric centers of the nodes in the cluster.

FIG. 5B conceptually illustrates this technique. In a given node 208 (generally the node which receives a write request) in a storage server cluster, a distance computation module 551 computes, for each node in the cluster, the distance between the similarity hash of a chunk to be written and the geometric center of the node. These distance values are provided to a node selection/chunk routing module 552, which selects the appropriate node to store the chunk (e.g., the node whose geometric center is closest to the similarity hash of the chunk) and routes the chunk to that node for storage. Modules 551 and 552 can be implemented in circuitry appropriately programmed with software and/or firmware, or in special-purpose ("hardwired") circuitry, or a combination thereof.

The technique introduced here can also include a load balancing method which tends to equalize the amount of space and/or I/O bandwidth used on each node of the cluster. It does so by enhancing the technique as described above with a parameter that is conceptually analogous to gravitational attraction. In certain embodiments, an integer acting as a gravitational coefficient is defined and regularly updated for each node. Further, the method includes keeping track of a "center of gravity" of each node, treating the position of each of the node's chunks as the center of a particle of equal mass. As the storage used on a node approaches its physical limit, or the rate of I/O operations to and from the node approaches the bandwidth limit, its gravitational coefficient is reduced towards zero. Each new chunk of data tends to be sent (other factors being equal) to the node that has the strongest gravitational attraction for it, based on the distance of the chunk's location from the center of gravity of the node, and the node's gravitational coefficient. Any known or convenient technique can be used to measure or estimate the parameters that affect the gravitational coefficient. For example, the N-module 214 in a node 218 (FIG. 2) might measure the rate of I/O operations for purposes of measuring bandwidth consumption, while the D-module 216 of the node might measure the amount of storage space consumption on the node.

The result of this technique is that when new data chunks are added to the storage cluster, they will tend to be sent to the storage node that has existing chunks of data with the maximum number of identical segments in common with the new chunk. This will provide greater opportunity for conventional intra-node deduplication techniques to reduce duplication on each node, thereby reducing duplication across the cluster.

Deduplication Segments

As explained above, large data sequences (files, extents, or blocks) are broken into fixed-length or variable-length pieces called segments for the purpose of deduplication. The goal of deduplication is that two different segments with the same contents do not exist. In a storage cluster, it is desirable to achieve this across all the nodes of the cluster, such that no two nodes of the cluster contain a segment with the same contents.

Either of two different approaches to breaking data into segments can be used. The technique introduced here applies equally to both approaches. The first approach involves breaking all sequences of data into fixed size segments. The segment size can be the same as the block size, in a block-based storage system, in which case each block would be a deduplication segment. However, if blocks are 4 KB, which is commonly the case, deduplication will often achieve a higher compression ratio by using smaller segments, e.g., 1 KB segments. One advantage of this method of segment definition is simplicity of implementation and simplicity of the metadata. However, a disadvantage is that it may miss some opportunities for deduplication. In particular, if two long data sequences are identical, except that one of them has a few extra bytes inserted at the beginning, the fixed-segment approach will not detect and eliminate any of that duplication, since segment boundaries are different within the two identical sequences.

The second approach for defining segments is to break long sequences of data into variable-sized segments based on their content. A well known way of doing this is to compute a rolling checksum while scanning the data sequence, and start a new segment every time the rolling checksum value satisfies a certain property, e.g. that its low-order n bits are all zero. Since the checksum is a pseudo-random hash, one would expect that its low-order 10 bits would all be zero roughly every 1,024 bytes, producing an average segment size of 1,024 bytes. A significant property and advantage of this method is that if two data sequences are very similar, but their identical sequences are shifted slightly, due to the insertion of a small amount of data in one of the two, they will be broken into segments most of which are identical between the two copies, and the two segments will be almost completely deduplicated.

Content Hash

For each deduplication segment, whether fixed size or variable-sized, a content hash is computed from the contents of the segment. This content hash is a fixed-length sequence of bits. In one embodiment it could be a 64-bit checksum computed from the contents. In another, it could be the SHA-1 function computed on the contents of the segment. The important property of the hash function is that any two segments with different contents have a very high probability of having different content hash values; that is, the hash function produces few collisions. (Any hash function that operates on contents that are longer than the output of the hash function will have some collisions, since there are more different contents than possible function output values.) The content hash of a deduplication segment can also be called the segment's "fingerprint", since it identifies a particular data segment contents with a very high confidence level.

In a simple form of cluster-wide deduplication, the content of each segment could be hashed to a node number, and the data segment would be sent to that node for storage. However, there are scalability problems with keeping track of the location of so many small data segments, as noted above. Therefore, the technique introduced here chooses a different strategy, which is described as follows.

Chunks and the Data Location Database

As described above, if data segments are assigned to nodes of the cluster based on the segments' content, rather than their addresses, then in order for a read operation to find requested segments, some form of cluster-wide database that maps segment addresses to nodes is needed. To reduce the size of such a database, the technique introduced here combines multiple adjacent deduplication segments into chunks, as described above. There are a fixed number of deduplication segments in each chunk. In one embodiment, there are between 500 and 2000 segments in each chunk. All of the segments within a chunk are sent together to the same node of the storage cluster.

Figure 6:
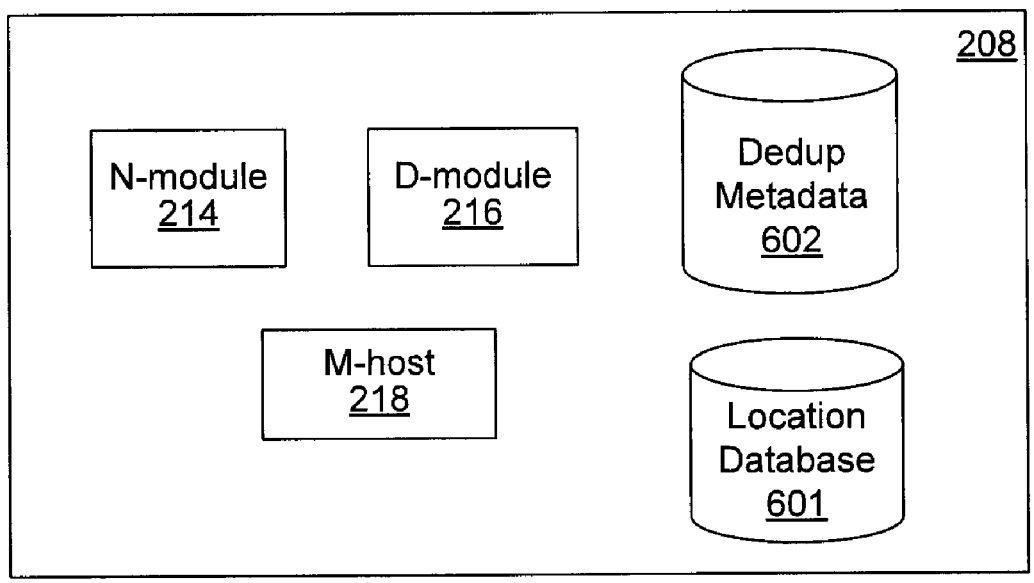
FIG. 6 illustrates various modules and databases in a storage server node.

Therefore, the cluster-wide location database mentioned above only needs to have one entry for each chunk, instead of one entry for each data segment within the chunk. This database is called the "data location database", or simply "location database". In certain embodiments, as illustrated in FIG. 6, each node 208 in the cluster includes an instance of the data location database 601. The location database 601 may be, for example, a subset of the RDB 220 (FIG. 2). This approach, which uses one entry for each chunk in the location database, reduces the overall space savings, since the same segment may appear in two different chunks that are sent to different nodes; however, it is a good compromise to ensure that the frequently used entries of the location database 601 can be cached in main memory and not require a disk access. This is important because the location database 601 generally must be accessed for every uncached read operation.

In a block-based system, chunks and segments can be uniquely identified by the block address (and offset) where they begin. In a file-based system or object-based system, chunks can be uniquely identified by the file or object in which they occur, together with the byte offset of the start of the chunk or segment. The location database 601, therefore, maps a block address and byte offset in a block-based system, or a file handle-plus-byte-offset in a file-based system, to the node that stores the chunk with that address.

In embodiments in which variable-sized deduplication segments are used, the location database 601 can be implemented as a b-tree, for example, to allow finding the chunk associated with a given byte address in time that is logarithmic in the number of chunks. In embodiments in which fixed-size deduplication segments are used, the location database 601 can be implemented as a simple array of node numbers, where the position within the array corresponds to the address of the segment. Because of their fixed size, and the fact that there are a fixed number of segments in each chunk, a segment address can be converted to a chunk number by a simple division operation, i.e., (segment address)/(number of segments per chunk). The most important piece of information in the table for each chunk is the node number on which it is stored, however, it could contain other information, such as the data and time that the chunk was last modified.

Similarity Hash

For each chunk 503, a similarity hash 510 is defined, based on the content hashes 508 of all of the segments 501 in the chunk. Assuming each content hash 508 is n bits long and there are k segments in each chunk 503, the similarity hash 510 can be an array of n integers, each in the range of 0 through k, where the integer value at position i is the number of occurrences of the value 1 in bit position i across the content hashes 508 of all of the segments 501 in the chunk. FIG. 5A shows a simple example for the case where n=4 and k=5. Note that these values are chosen only for purposes of simplifying description.

Deduplication Metadata

In addition to maintaining an instance of the location database 601, each node 208 in the cluster also includes a database 602 of deduplication metadata relating to that node, i.e., a deduplication metadata database 602, as illustrated in FIG. 6 (in practice it can be implemented as multiple databases). In each node 208, the following items of metadata are maintained and stored persistently:

1) The similarity hash of each chunk stored in the node.
2) The starting address of each chunk stored in the node. This information is used within the node to map a virtual address of the chunk to a physical address of the chunk.
3) The geometric center of the node.
4) The gravitational coefficient and center of gravity of the node (discussed further below).

All of this metadata can be stored on, for example, the D-module of the node.

For each node 208 of the cluster, an array of integers of the same size as the similarity hash is also maintained. This is called the geometric center of the node, as will now be explained. A similarity hash 510 is, in one embodiment, an array of n integers in the range of 0 through k. It therefore can be treated as a point within the n-dimensional hyper-cube bounded by the range 0 through k on all axes. Viewed this way, the geometric center of the chunks on each node 208 can be obtained by performing a position-wise (coordinate-wise) summation of the similarity hashes 510 of all chunks stored in the node and then dividing the result position-wise by the number, n, of chunks stored in the node, e.g., (p1+p2+ . . . +pn)/n. It should be clear that two chunks that differ in only a few blocks will have similarity hashes that are nearer to each other in n-space than would be expected by chance, which is the intuition behind using this abstraction.

The geometric center of a node 208 is a collective characterization of all of the data segments on that node, for example, an expression of the average of all of the data segments on the node. Thus, the system can use it in determining on which node each new chunk of data should be stored, in order to increase the amount of deduplication that can be performed.

In the initial state of an empty node, the geometric center is not defined by the above rule, as there are no chunks stored on it yet. In that case, its geometric center is defined to be the origin point in n-dimensional space, i.e., the point with all coordinates zero.

Figure 7:
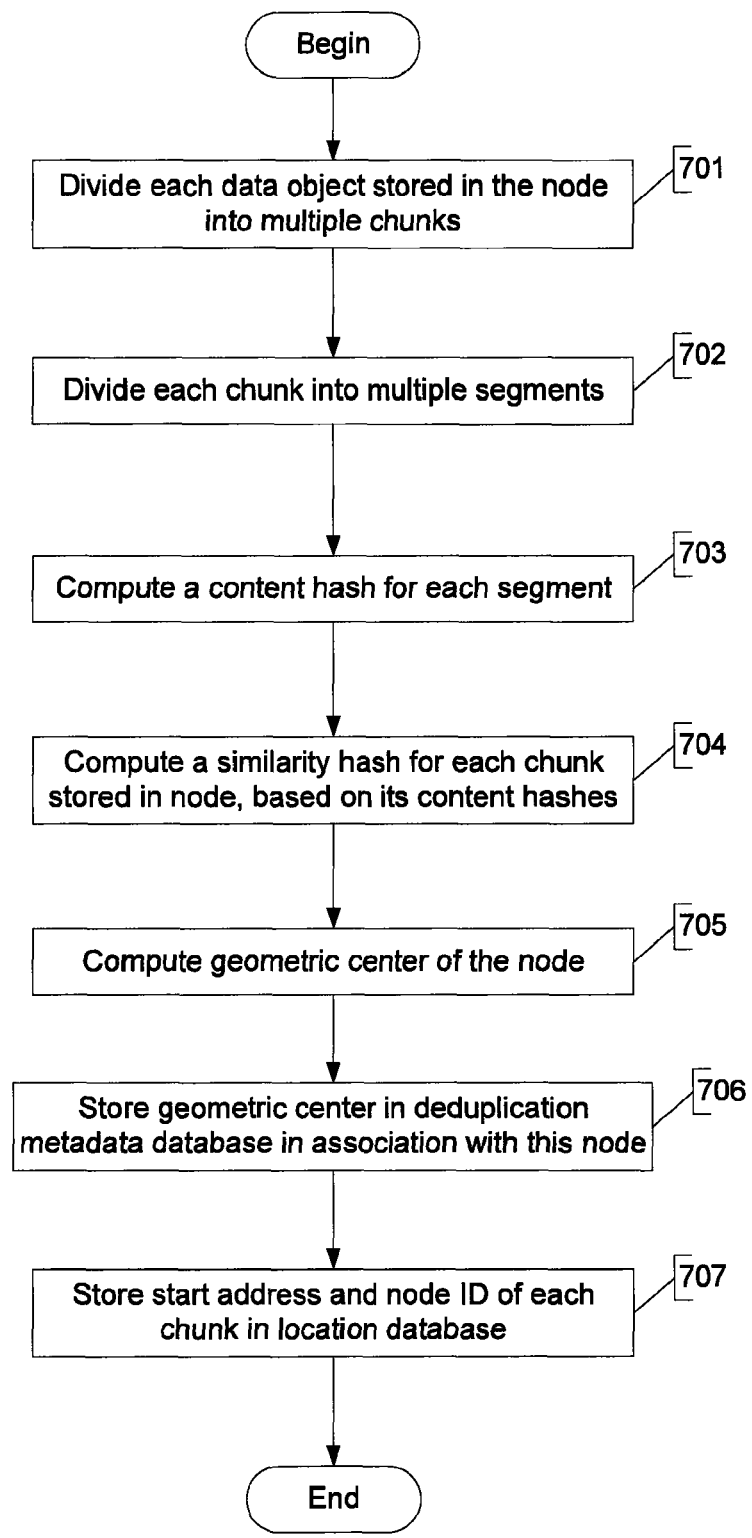
FIG. 7 shows an example of a process of computing various types of deduplication metadata for a given node.

FIG. 7 shows an example of the process of computing the various types of deduplication metadata for a given node 208. This process may be performed by, for example, any one or more of the layers illustrated in FIG. 4, such as the storage manager 460, or by a separate dedicated layer. This example assumes that data is already stored on the node, i.e., the node is not empty.

Initially, at 701 the process divides each data object storage node into multiple chunks 503 (FIG. 5A). At 702 the process then divides each chunk 503 into multiple segments 501. Next, the process computes a content hash 508 for each segment at 703. As noted, the content hashes 508 can be computed using, for example, a content-based checksum or the SHA-1 algorithm. At 704 the process computes a similarity hash 510 for each chunk 503 stored in the node, based on the content hashes of the segments of each chunk. The process then computes the geometric center of the node at 705, in the manner described above. At 706 the process stores the geometric center in the deduplication metadata database 602 of this node. Then, at 707 the process stores the starting address and node ID of each chunk in the node in the (replicated) location database 601.

Writes

Figure 8:
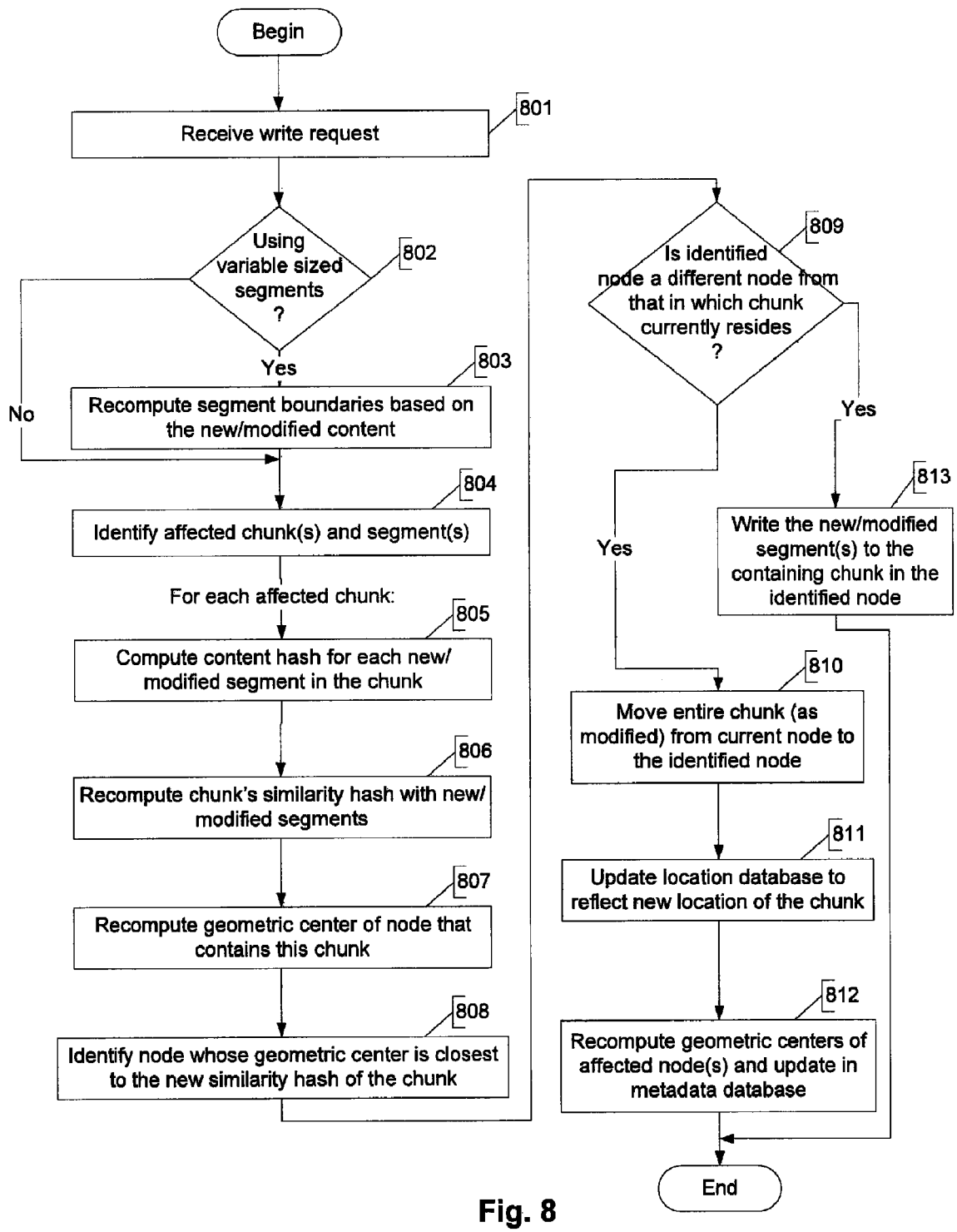
FIG. 8 illustrates an example of a process of handling a write request in a storage server cluster.

FIG. 8 illustrates an example of the process of handling a write request in which one or more segments of a chunk are to be modified, in a storage server cluster. Initially, at 801 the n-module 214 of one of the nodes 208 in the cluster receives a write request from a client. If the system is using variable-sized segments (802), then at 803 the receiving n-module 214 recomputes the segment boundaries based on the new or modified content in the write request. The manner in which the segment boundaries are computed/recomputed is not germane to the technique introduced here; any known or convenient technique for computing boundaries of variable-sized deduplication segments can be used. If the system is using fixed-sized segments, however, then operation 803 is bypassed, and the process continues to 804.

At 804 the receiving n-module 214 identifies the chunk(s) and segment(s) that is/are affected (written) by the write request. It is assumed that in a block-based system the write request provides a starting block address and one or more blocks to be written. It is further assumed that in a file-based system (e.g., an NFS or CIFS based system) the write request provides a file handle, a starting byte offset, and one or more bytes of data to be written. The affected chunk(s) and segment(s) can be identified easily from the information in the write request, although the details of this operation depend on which type of system is used (block-based or file-based), and further, whether the system uses fixed-size segments or variable-size segments.

If fixed-sized deduplication segments are used, all chunks are the same size in bytes, since there is also a fixed number of segments per chunk. For example, if there are 4,096 bytes per segment and 512 segments per chunk, there are exactly 2,097,152 bytes (2 MB) in each chunk. In that case, whether using a block-based system or a file-based system, the conversion from a byte address (in a read or write request) to a chunk number involves merely dividing the byte address by the number of bytes per chunk. In a file-based system, this operation would produce a chunk number within the particular open file identified by a file handle, whereas in a block-based system it would produce the address of the chunk within the volume.

If variable-sized deduplication segments are used, one method for converting a byte address to a chunk number is to maintain a b-tree on permanent storage, that maps byte addresses to chunk information. The b-tree can reside on each N-module 2114 and/or it can be part of the data location database 601. The b-tree allows finding the right chunk (given a byte address) in time that varies logarithmically with the number of chunks. In the case of a block-based system there can be one b-tree for each block-based volume. In the case of a file-based system there can be one b-tree for each file.

The process then performs operations 805-812, as will now be described, for each affected chunk. These operations can be, but do not have to be, performed by the n-module 214 of the node that received the write request.

At 805 the process computes (or recomputes) a content hash for each segment affected by the write request. The process then at 806 recomputes the chunk's similarity hash based on the content hashes of the chunk has modified with the new or modified segment(s). In one embodiment, to do this the receiving n-module 214 first requests and receives the existing (old) content hashes of all the segments in the chunk, from the D-module 216 of the node in which the chunk currently resides (as identified from the location database). The computation can be done by simply subtracting, from the old similarity hash, the "1" bits in the old content hashes and adding to it the "1" bits in the new content hashes.

Next, at 807 the process recomputes the geometric center of the node that contains this chunk; this update is reflected at least in the deduplication metadata database of that node. This recomputation can be accomplished as follows. In the case of modifying a chunk, the point (vector) represented by the similarity hash of the old version of the chunk is subtracted out of the sum of all of the points represented by the similarity hashes of all of the chunks on the node (recall that the sum of a set of points is defined to be the point whose ith component is the sum of the ith components of all the points in the set). Then the point represented by the similarity hash of the new version of the chunk (i.e., the point in n-space) is added into the sum of all points for the node. This sum is then divided by the number of points to produce the geometric center. In the case of adding a new chunk, the new point is added to the sum of the points on the node, which is then divided by the new number of points, to produce the new geometric center.

Referring still to FIG. 8, at 808 the process then identifies the node whose geometric center is closest to the new similarity hash for the chunk. This is a search among a relatively small number of items, i.e., the number of nodes in the cluster. For each node, this operation involves a computation of the distance between two points in n-dimensional space. The distance measure can be, but does not have to be, Euclidean (which involves expensive squaring and square root operations). For example, as an alternative, in one embodiment the distance measure is the sum of the absolute values of the difference at each component of the vector, i.e.:

$$\sum_{i=1}^{n} |p1[i] - p2[i]|$$

If the node identified at 808 is the node in which the chunk currently resides (809), then the process proceeds to 813, where the process writes the affected segment(s) to the chunk in the identified node. The process then ends (at least with respect to the current affected chunk).

On the other hand, if the node identified at 808 is a different node from that in which the chunk currently resides, then the process instead proceeds from 809 to 810. At 810 the process moves the entire chunk, as modified with the new/modified segment(s), from its current node to the node identified at 808. The process then updates the location database to reflect the new location of the chunk at 811. This update is reflected in all instances of the location database. The process then recomputes the geometric center of both affected nodes, i.e., the node from which the chunk is being moved and the node to which the chunk is being moved. The process then ends (at least with respect to the current affected chunk). As mentioned above, this process can be extended to also take into account the "gravitational attraction" of each node when determining where to store a modified chunk, as further described below.

Reads

Figure 9:
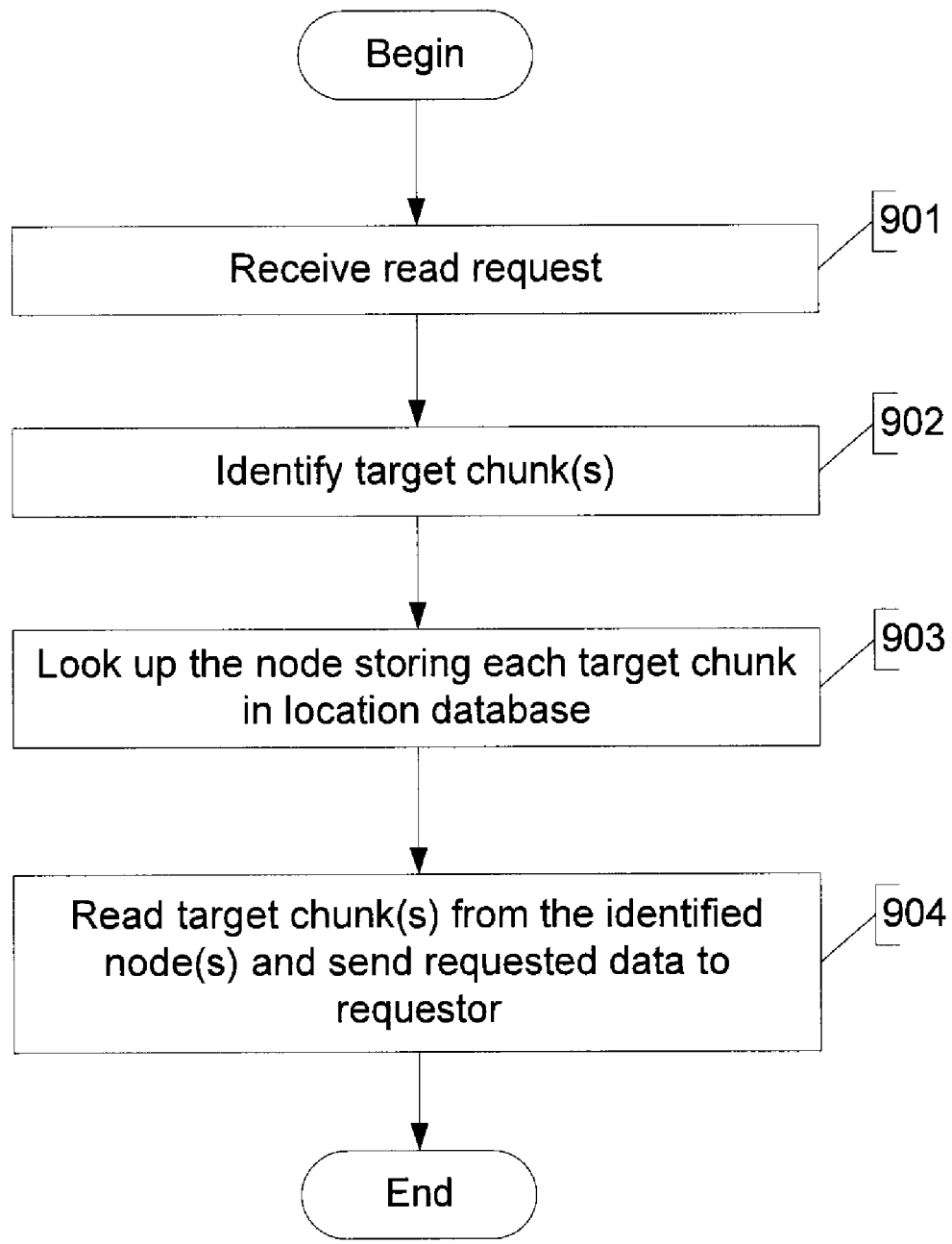
FIG. 9 illustrates an example of the process of handling a read request in a storage server cluster.

FIG. 9 illustrates an example of the process of handling a read request in a storage server cluster. Initially, at 901 the n-module 214 of one of the nodes 208 in the cluster receives a read request from a client. The process then identifies at 902 the chunk(s) that are the target of the read request (the "target chunk(s)"). It is assumed that in a block-based system the read request provides a starting block address and the number of blocks to be read. It is further assumed that in a file-based system (e.g., an NFS or CIFS based system) the read request provides a file handle, a starting byte offset, and the number of bytes to be read. As in the write case, the target chunk(s) can be identified easily from the information in the request (in this case the read request), although the details of this operation depend on which type of system is used, and further, whether the system uses fixed-size segments or variable-size segments. Chunk identification can be accomplished in the manner described above regarding write requests.

At 903 the receiving n-module looks up, in the location database, the node which currently stores each target chunk. At 904 the process then reads the target chunk(s) from the identified node(s) and sends the requested data to the requester.

Load Balancing

It may be desirable to implement capacity balancing in a storage cluster that implements deduplication by similarity hashing, so that one node does not fill up before others. This is likely to happen if, for example, there are many highly similar large files, most of the chunks of which are sent to identical nodes. To accomplish this balancing, the geometric center approach described above can be extended to use a notion of gravitational attraction.

Specifically, in one embodiment each node maintains a gravitational coefficient that decreases as more chunks are stored on the node (in a manner opposite to Newtonian physics, where the gravitational coefficient increases with mass). A possible value for the gravitational coefficient is the percentage of free space left on the node. The criterion for selecting a node on which to store a chunk can then become the following: Select the node that has the highest gravitational attraction for the chunk, which can be computed as the gravitational coefficient of the node divided by the chunk's distance from the geometric center of the node. It is not necessary to use a physically accurate inverse square law of gravitation, which would be more computationally expensive.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    receiving, at a storage server cluster, a data segment to be written, the storage server cluster including a plurality of nodes that each store data;
    computing a first value from a data chunk that contains the received data segment;
    for each of the plurality of nodes, computing a second value from a plurality of data chunks stored in said node;
    for each of the plurality of nodes, determining a distance value representing a measure of similarity between the data chunk that contains the received data segment and the data stored in the node, based on the first value and based on the second value of the node; and
    selecting, at the storage server cluster, one of the nodes to store the received data segment, based on the distance values.

2. A method as recited in claim 1, wherein said selecting comprises:
    using the distance values to identify said one of the plurality of nodes as being most likely to have already stored a data chunk including the received data segment or data similar to the received data segment.

3. A method as recited in claim 1, wherein the first value is a similarity hash of the data chunk that contains the received data segment, and the second value for each node is a function of similarity hashes of the plurality of data chunks stored on the node, each said data chunk containing a plurality of data segments.

4. A method as recited in claim 3, wherein the second value for each node represents a geometric center of the similarity hashes of the data chunks stored on the node.

5. A method as recited in claim 3, further comprising:
    computing a coefficient of each of the nodes, the coefficient for each node being a function of a current load on the node; and
    for each of the nodes, computing a measure of attraction of the received data segment to the node as a function of the distance value and the coefficient;
    wherein said selecting one of the nodes to store the received data segment comprises selecting said one of the nodes based on the measure of attraction of the received data segment to each of the nodes.

6. A method as recited in claim 5, further comprising updating the coefficient and the geometric center of a given node of the storage server cluster in response to changes to data stored in the given node.

7. A method as recited in claim 5, wherein the measure of attraction of the received data segment to a given node is proportional to the coefficient of the given node divided by the distance value of the given node.

8. A method as recited in claim 3, wherein each of the data chunks is a deduplication chunk, and wherein for each of the nodes, computing the second value comprises:
    grouping pluralities of contiguous deduplication segments stored on the node into a plurality of deduplication chunks;
    computing a similarity hash for each deduplication chunk based on content hashes of deduplication segments within the deduplication chunk; and
    computing the second value for the node based on the similarity hashes of the deduplication chunks in the node.

9. A method as recited in claim 8, further comprising:
    maintaining a data location database in the storage server cluster, the data location database including one entry for each deduplication chunk in the storage server cluster, each said entry indicating a node of the storage server cluster in which the corresponding deduplication chunk is stored; and
    using the data location database in response to a read request to locate a node of the storage server cluster in which requested data is stored.

10. A method comprising:
    for each of a plurality of nodes in a storage server cluster, computing a value representative of contents of a plurality of segments of data stored on the node, wherein each said value is computed to represent a geometric center of data stored on the corresponding node;
    receiving, at the storage server cluster, a data segment to be written; and selecting one of the nodes to receive the data segment according to a deduplication criterion, based on the computed values.

11. A method as recited in claim 10, wherein said selecting comprises:
selecting one of the nodes to receive the data segment, based on a measure of similarity between a value computed for a data chunk that contains the data segment and the computed values for the plurality of nodes.

12. A method as recited in claim 10, wherein selecting one of the nodes to receive the data segment comprises selecting one of the nodes to receive the data segment based on a measure of similarity between a data chunk that contains the data segment and the computed values for the nodes.

13. A method as recited in claim 12, wherein for each of the nodes, computing the value comprises:
computing a similarity hash for each of a plurality of data chunks stored in the node, each data chunk containing a plurality of deduplication segments, each similarity hash being a function of content hashes of the deduplication segments within the corresponding data chunk; and
computing the value as a geometric center of all of the similarity hashes computed for the data chunks in the node.

14. A method as recited in claim 10, further comprising:
computing a coefficient for each of the nodes, each said coefficient being a function of a current load on an associated one of the nodes; and
automatically moving groups of similar data from current nodes to less loaded nodes based on the coefficients of the nodes.

15. A method as recited in claim 10, further comprising:
maintaining a data location database in the storage server cluster, the data location database including a separate entry for each of a plurality of deduplication chunks of data in the storage server cluster, each said entry indicating a node of the storage server cluster in which the corresponding deduplication chunk is stored; and
using the data location database in response to a read request to locate a node of the storage server cluster in which data requested by the read request is stored.

16. A method comprising:
in each of a plurality of nodes in a storage server cluster, defining a plurality of chunks from data stored in the node;
defining a plurality of contiguous deduplication segments from each of the chunks;
computing a content hash for each of the deduplication segments;
computing a similarity hash for each of the chunks based on the content hashes of the deduplication segments within the chunk; and
computing a geometric center for the node based on the similarity hashes of the chunks in the node;
receiving, at the storage server cluster, a data segment to be written;
computing a similarity hash value of a chunk that contains the received data segment;
computing a distance value for each of the plurality of nodes, based on the similarity hash value of the chunk that contains the received data segment and the similarity hashes of the chunks stored on the node; and
selecting one of the nodes of the storage server cluster to receive the data segment, based on the distance values computed for the plurality of nodes.

17. A method as recited in claim 16, wherein each distance value represents a measure of similarity between the chunk that contains the received data segment and data stored in the corresponding node.

18. A method as recited in claim 16, further comprising:
computing a coefficient of each of the nodes, the coefficient for each node being a function of a current load on the node;
for each of the nodes, computing a measure of attraction of the received data segment to the node as a function of the distance value and the coefficient;
wherein said selecting one of the nodes to receive the data segment is based on the measure of attraction of the received data segment to each of the nodes.

19. A method as recited in claim 18, wherein the measure of attraction of the received data segment to a given node is proportional to the coefficient of the given node divided by the distance value of the given node.

20. A storage server cluster comprising:
a plurality of storage server nodes; and
a processor configured to control at least one of the nodes to execute a process which includes
receiving a data segment to be written;
using a similarity hash of the data segment and a plurality of geometric centers for the plurality of storage server nodes to identify one of the plurality of nodes that is most likely to have already stored a data chunk including the received data segment or data similar to the received data segment, wherein each geometric center of the plurality of geometric centers is a function of similarity hashes of a plurality of data chunks stored in a particular storage server node of the plurality of storage server nodes; and
sending the received data segment to the identified node for storage.

21. A storage server cluster as recited in claim 20, wherein the process further includes:
computing a coefficient for a given node as a function of a current load on the node; and
automatically moving a group of similar data from the given node to a less loaded node based on coefficients of the given nodes.

22. A storage server cluster as recited in claim 20, wherein the process further includes:
maintaining a data location database, the data location database including one entry for each of a plurality of deduplication chunks of data in the storage server cluster, each said entry indicating a node of the storage server cluster in which the corresponding deduplication chunk is stored;
the data location database for use in response to a read request to locate a node of the storage server cluster in which requested data is stored.

23. A storage system comprising:
a plurality of server nodes, each said node including
a network interface through which to communicate over a network with a storage client;
a storage interface through which to communicate with a non-volatile mass storage facility; and
a processor coupled to the network interface and the storage interface, the processor configured to:
compute a similarity hash for each of a plurality of data chunks stored in the node, wherein each said data chunk contains a plurality of deduplication segments, and wherein each similarity hash is a function of content hashes of the deduplication segments within the corresponding data chunk;

compute a geometric center of the node as a function of the similarity hashes of the plurality of data chunks stored in the node;

compute a new similarity hash based on a data segment to be written, received by the node;

compute a similarity measure for each of the plurality of nodes, each said similarity measure being based on the new similarity hash and a geometric center computed for each of the plurality of nodes; and select one of the nodes of the storage server cluster to store the received data segment, based on the similarity measure computed for each of the nodes.

24. A storage system as recited in claim 23, wherein selection of one of the nodes to store the received data segment comprises:

identifying said one of the plurality of nodes as being most likely to have already stored a data chunk including the received data segment or data similar to the received data segment.

25. A storage system as recited in claim 23, wherein selection of one of the nodes to store the received data segment comprises:

receive a coefficient computed for each of the nodes, each coefficient being a function of a current load on the corresponding node; and automatically move a group of similar data to another node based on the coefficients of the nodes.

26. A storage system as recited in claim 23, wherein each of the processors of the server nodes is further configured to:

access a data location database, the data location database including one entry for each of a plurality of data chunks stored in the storage server cluster, each said entry indicating which node of the storage system stores a particular data chunk of the plurality of data chunks; and use the data location database in response to a read request to locate a node of the storage system in which data requested by the read request is stored.

* * * * *